(12) United States Patent
Patterson et al.

(10) Patent No.: US 7,762,585 B2
(45) Date of Patent: Jul. 27, 2010

(54) GAS GENERATOR

(75) Inventors: Donald B. Patterson, Rochester, MI (US); Scott A. Mason, St. Clair, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 396 days.

(21) Appl. No.: 11/479,494

(22) Filed: Jun. 30, 2006

(65) Prior Publication Data

US 2007/0001438 A1 Jan. 4, 2007

Related U.S. Application Data

(60) Provisional application No. 60/695,488, filed on Jun. 30, 2005.

(51) Int. Cl.
*B60R 21/26* (2006.01)
(52) U.S. Cl. .................. 280/740; 280/736; 280/741; 280/742
(58) Field of Classification Search .......... 102/530, 102/531; 222/3; 280/736, 740–742
See application file for complete search history.

(56) References Cited

U.S. PATENT DOCUMENTS

| | | | | |
|---|---|---|---|---|
| 1,939,700 A | | 12/1933 | Hofstetter | ............. 89/14.2 |
| 2,891,525 A | | 6/1959 | Moore | ............. 123/90.51 |
| 2,959,127 A | | 11/1960 | Weinert | ............. 102/368 |
| 3,711,115 A | * | 1/1973 | Lohr | ............. 280/736 |
| 3,787,010 A | * | 1/1974 | Meranshian et al. | ............. 244/146 |
| 3,794,347 A | | 2/1974 | Zens | ............. 280/150 |
| 3,807,144 A | * | 4/1974 | Graybill | ............. 96/292 |
| 3,877,882 A | | 4/1975 | Lette et al. | ............. 23/281 |
| 3,880,447 A | | 4/1975 | Thorn et al. | |
| 3,958,949 A | | 5/1976 | Plantif et al. | |
| 3,972,545 A | * | 8/1976 | Kirchoff et al. | ............. 280/735 |
| 3,985,076 A | | 10/1976 | Schneiter et al. | |
| 3,986,456 A | * | 10/1976 | Doin et al. | ............. 102/531 |
| 4,001,750 A | | 1/1977 | Scherer et al. | ............. 337/280 |

(Continued)

FOREIGN PATENT DOCUMENTS

DE 40 19 877 A1 6/1990

(Continued)

OTHER PUBLICATIONS

U.S. Appl. No. 11/251,255.

(Continued)

*Primary Examiner*—Paul N. Dickson
*Assistant Examiner*—Laura Freedman
(74) *Attorney, Agent, or Firm*—L.C. Begin & Associates, PLLC.

(57) ABSTRACT

A baffle system (30) for use in a gas generating system (10). The baffle system (30) includes a plurality of adjacent plates (82a, 82b, 86), each plate of the plurality of adjacent plates having at least one through orifice formed therein. Each orifice in any given plate of the plurality of adjacent plates (82a, 82b, 86) is in fluid communication with at least one orifice in each plate adjacent the given plate so as to provide at least one gas flow path extending through the plurality of adjacent plates. A gas generating system (10) incorporating the baffle system (30), and a vehicle occupant protection system (180) incorporating the gas generating system (10), are also described.

12 Claims, 3 Drawing Sheets

U.S. PATENT DOCUMENTS

| | | | | |
|---|---|---|---|---|
| 4,012,189 | A | | 3/1977 | Vogt et al. ............... 431/353 |
| 4,158,696 | A | * | 6/1979 | Wilhelm ................. 422/166 |
| 4,215,631 | A | | 8/1980 | Rucker .................... 102/27 |
| 4,276,065 | A | * | 6/1981 | Miko et al. ............... 96/394 |
| 4,530,516 | A | | 7/1985 | Adams et al. ........... 280/741 |
| 4,547,342 | A | * | 10/1985 | Adams et al. ........... 422/166 |
| 4,588,043 | A | | 5/1986 | Finn ....................... 181/223 |
| 4,611,374 | A | | 9/1986 | Schnelle et al. ....... 29/890.13 |
| 4,722,551 | A | | 2/1988 | Adams |
| 4,730,558 | A | | 3/1988 | Florin et al. ............ 102/218 |
| 4,762,067 | A | | 8/1988 | Barker et al. ............ 102/313 |
| 4,817,828 | A | * | 4/1989 | Goetz ........................ 222/3 |
| 4,886,293 | A | | 12/1989 | Weiler et al. |
| 4,950,458 | A | | 8/1990 | Cunningham ........... 422/164 |
| 4,998,750 | A | * | 3/1991 | Werner et al. ........... 280/740 |
| 5,028,070 | A | | 7/1991 | Bender |
| 5,048,862 | A | | 9/1991 | Bender et al. |
| 5,100,171 | A | | 3/1992 | Faigle et al. ............ 280/736 |
| 5,215,721 | A | | 6/1993 | Tasaki et al. |
| 5,226,669 | A | * | 7/1993 | Honda ................... 280/737 |
| 5,259,643 | A | * | 11/1993 | Kraft et al. .............. 280/740 |
| 5,268,013 | A | * | 12/1993 | Bruncher et al. ........... 55/486 |
| 5,294,244 | A | | 3/1994 | Allerton, III et al. ....... 75/401 |
| 5,318,323 | A | | 6/1994 | Pietz ..................... 280/736 |
| 5,333,656 | A | | 8/1994 | Mackal .................. 141/330 |
| 5,340,150 | A | | 8/1994 | Harada et al. |
| 5,372,449 | A | | 12/1994 | Bauer et al. ............. 403/273 |
| 5,387,009 | A | | 2/1995 | Lauritzen et al. |
| 5,406,889 | A | | 4/1995 | Letendre et al. |
| 5,443,286 | A | | 8/1995 | Cunningham et al. |
| 5,466,420 | A | | 11/1995 | Parker et al. |
| 5,509,686 | A | | 4/1996 | Shepherd et al. ........ 280/738 |
| 5,516,147 | A | | 5/1996 | Clark et al. ............. 280/737 |
| 5,533,751 | A | | 7/1996 | Kort et al. .............. 280/737 |
| 5,556,439 | A | | 9/1996 | Rink et al. ............... 55/487 |
| 5,562,304 | A | | 10/1996 | Gest ...................... 280/740 |
| 5,564,743 | A | | 10/1996 | Marchant ............... 280/741 |
| 5,582,427 | A | | 12/1996 | Rink et al. .............. 280/740 |
| 5,584,506 | A | * | 12/1996 | Van Wynsberghe ...... 280/741 |
| 5,588,676 | A | | 12/1996 | Clark et al. ............. 280/741 |
| 5,609,360 | A | | 3/1997 | Faigle et al. ............ 280/740 |
| 5,611,566 | A | | 3/1997 | Simon et al. ............ 280/736 |
| 5,613,703 | A | | 3/1997 | Fischer .................. 280/741 |
| 5,622,380 | A | | 4/1997 | Khandhadia et al. ..... 280/736 |
| 5,624,133 | A | | 4/1997 | Wong |
| 5,624,134 | A | | 4/1997 | Iwai et al. |
| 5,628,528 | A | | 5/1997 | DeSautelle et al. ...... 280/736 |
| 5,630,619 | A | | 5/1997 | Buchanan et al. ........ 280/741 |
| 5,662,722 | A | | 9/1997 | Shiban ..................... 55/413 |
| 5,702,494 | A | | 12/1997 | Tompkins et al. .......... 55/498 |
| 5,725,245 | A | | 3/1998 | O'Driscoll et al. |
| 5,799,973 | A | | 9/1998 | Bauer et al. ............. 280/741 |
| 5,813,695 | A | | 9/1998 | O'Driscoll et al. |
| 5,829,784 | A | * | 11/1998 | Brown et al. ............ 280/737 |
| 5,829,785 | A | | 11/1998 | Jordan et al. ............ 280/741 |
| 5,833,264 | A | * | 11/1998 | Honda et al. ............ 280/741 |
| 5,845,935 | A | | 12/1998 | Enders et al. ........... 280/743.2 |
| 5,860,672 | A | | 1/1999 | Petersen ................. 280/728.2 |
| 5,872,329 | A | | 2/1999 | Burns et al. ............... 149/36 |
| 5,934,705 | A | | 8/1999 | Siddiqui et al. ........... 280/736 |
| 5,941,562 | A | | 8/1999 | Rink et al. ............... 280/741 |
| 5,970,880 | A | | 10/1999 | Perotto .................. 102/531 |
| 6,019,389 | A | | 2/2000 | Burgi et al. ............. 280/736 |
| 6,032,979 | A | | 3/2000 | Mossi et al. ............. 280/741 |
| 6,074,502 | A | | 6/2000 | Burns et al. |
| 6,095,556 | A | | 8/2000 | Bailey et al. ............ 280/737 |
| 6,095,559 | A | | 8/2000 | Smith et al. ............. 280/741 |
| 6,095,561 | A | | 8/2000 | Siddiqui et al. ........... 280/472 |
| 6,106,000 | A | | 8/2000 | Stewart .................. 280/728.2 |
| 6,116,491 | A | | 9/2000 | Kutoh ...................... 228/42 |
| 6,210,505 | B1 | | 4/2001 | Khandhadia et al. ....... 149/36 |
| 6,244,623 | B1 | | 6/2001 | Moore et al. ............ 280/471 |
| 6,379,627 | B1 | | 4/2002 | Nguyen et al. ........... 422/165 |
| 6,464,254 | B2 | | 10/2002 | Chikaraishi et al. ...... 280/741 |
| 6,474,684 | B1 | | 11/2002 | Ludwig et al. |
| 6,485,051 | B1 | | 11/2002 | Taguchi et al. |
| 6,581,963 | B2 | | 6/2003 | Mangun ................. 280/741 |
| 6,709,012 | B1 | | 3/2004 | Tanaka et al. |
| 6,764,096 | B2 | | 7/2004 | Quioc |
| 6,776,434 | B2 | | 8/2004 | Ford et al. .............. 280/729 |
| 6,846,014 | B2 | | 1/2005 | Rink et al. .............. 280/740 |
| 6,851,705 | B2 | | 2/2005 | Young et al. |
| 6,860,510 | B2 | | 3/2005 | Ogawa et al. ............ 280/736 |
| 6,871,873 | B2 | | 3/2005 | Quioc et al. ............. 280/741 |
| 6,908,104 | B2 | | 6/2005 | Canterbery et al. ....... 280/736 |
| 6,929,284 | B1 | | 8/2005 | Saso et al. |
| 6,935,655 | B2 | | 8/2005 | Longhurst et al. ........ 280/736 |
| 6,945,561 | B2 | | 9/2005 | Nakashima et al. |
| 6,948,737 | B2 | | 9/2005 | Ohji et al. |
| 6,976,702 | B2 | | 12/2005 | Yokota et al. ........... 280/730.2 |
| 7,073,820 | B2 | * | 7/2006 | McCormick .............. 280/741 |
| 7,178,830 | B2 | | 2/2007 | Blackburn ............... 280/736 |
| 7,237,801 | B2 | | 7/2007 | Quioc et al. ............. 280/736 |
| 7,267,365 | B2 | | 9/2007 | Quioc .................... 280/736 |
| 7,275,760 | B2 | * | 10/2007 | Quioc et al. ............. 280/736 |
| 7,302,893 | B2 | * | 12/2007 | Blackburn ............... 102/530 |
| 7,343,862 | B2 | | 3/2008 | McCormick .............. 102/530 |
| 7,390,019 | B2 | | 6/2008 | Gotoh et al. ............. 280/741 |
| 7,654,565 | B2 | | 2/2010 | McCormick et al. ...... 280/736 |
| 2002/0053789 | A1 | | 5/2002 | Fujimoto |
| 2003/0127840 | A1 | | 7/2003 | Nakashima et al. |
| 2003/0155757 | A1 | | 8/2003 | Larsen et al. ............ 280/741 |
| 2003/0201628 | A1 | | 10/2003 | Choudhury et al. ....... 280/729 |
| 2004/0046373 | A1 | | 3/2004 | Wang et al. |
| 2004/0201208 | A1 | * | 10/2004 | Longhurst et al. ........ 280/741 |
| 2005/0001414 | A1 | | 1/2005 | Matsuda et al. |
| 2005/0103798 | A1 | * | 5/2005 | Luigi ....................... 222/3 |
| 2005/0134031 | A1 | | 6/2005 | McCormick .............. 280/741 |
| 2005/0161925 | A1 | | 7/2005 | Blackburn |
| 2005/0194772 | A1 | | 9/2005 | Numoto et al. |
| 2005/0230949 | A1 | | 10/2005 | Blackburn ............... 280/736 |
| 2005/0263993 | A1 | | 12/2005 | Blackburn |
| 2005/0263994 | A1 | | 12/2005 | Quioc .................... 280/741 |
| 2005/0280252 | A1 | | 12/2005 | McCormick |
| 2006/0001247 | A1 | * | 1/2006 | Young et al. ............. 280/741 |
| 2006/0005734 | A1 | | 1/2006 | McCormick |
| 2006/0043716 | A1 | | 3/2006 | Quioc |
| 2006/0082112 | A1 | | 4/2006 | Blackburn ............... 280/736 |
| 2006/0261584 | A1 | | 11/2006 | Blackburn ............... 280/740 |
| 2006/0273564 | A1 | | 12/2006 | McCormick et al. ...... 280/740 |
| 2007/0095035 | A1 | | 5/2007 | Quioc .................... 55/462 |
| 2008/0118408 | A1 | | 5/2008 | Numoto et al. ........... 422/167 |

FOREIGN PATENT DOCUMENTS

| | | | |
|---|---|---|---|
| DE | 3921473 C1 | * | 11/1990 |
| DE | 4005768 A1 | * | 8/1991 |
| DE | 4009551 A1 | * | 9/1991 |
| DE | 4102615 A1 | * | 8/1992 |
| EP | 0602785 B1 | | 10/1993 |
| EP | 0728633 A1 | | 2/1996 |
| EP | 0844149 A1 | | 11/1997 |
| EP | 1122134 B1 | | 7/2000 |
| EP | 1308353 A2 | | 9/2002 |
| JP | 04055151 A | | 2/1992 |
| JP | 04129859 A | * | 4/1992 |
| JP | 05096147 | | 4/1993 |
| JP | 05178155 A | | 7/1993 |
| JP | 05178156 A | | 7/1993 |
| JP | 06227358 A | | 8/1994 |
| WO | WO 98/39183 | | 9/1998 |
| WO | WO 2004/091982 A1 | | 10/2004 |
| WO | WO 2005/035312 A2 | | 4/2005 |
| WO | WO 2005/058645 A2 | | 6/2005 |

| WO | WO 2005/086917 | 9/2005 |
| --- | --- | --- |
| WO | WO 2006/044516 A2 | 4/2006 |
| WO | WO 2006/078819 A2 | 7/2006 |

OTHER PUBLICATIONS

U.S. Appl. No. 11/358,786.

Office Action U.S. Appl. No. 11/358,786, filed Feb. 21, 2006, Dated Sep. 18, 2008.

Office Action U.S. Appl. No. 11/358,786, filed Feb. 21, 2005, Dated Mar. 21, 2008.

Office Action U.S. Appl. No. 11/445,859, filed Jun. 1, 2006, Dated Sep. 18, 2008.

Office Action for U.S. Appl. No. 11/140,055, filed May 27, 2005, dated Apr. 20, 2007.

Office Action for U.S. Appl. No. 11/140,055, filed May 27, 2005, dated Dec. 12, 2007.

Office Action for U.S. Appl. No. 11/167,849, filed Jun. 27, 2005, dated for Jan. 14, 2008.

Office Action for U.S. Appl. No. 11/445,859, filed Jun. 1, 2006, dated Mar. 4, 2008.

Office Action for U.S. Appl. No. 11/358,786 filed Feb. 21, 2006.

Office Action U.S. Appl. No. 11/445,859, filed Jun. 1, 2006, dated for Feb. 25, 2009.

Office Action U.S. Appl. No. 11/591,321, filed Oct. 31, 2006, dated for Mar. 24, 2009 (133).

Office Action U.S. Appl. No. 11/167,849, filed Jun. 27, 2005, dated for Jun. 24, 2009 (88).

Office Action U.S. Appl. No. 11/591,321, filed Oct. 31, 2006, dated for Sep. 9, 2009 (133).

Office Action U.S. Appl. No. 11/591,321, filed Oct. 31, 2006, dated for Jan. 29, 2010 (133).

Office Action U.S. Appl. No. 11/167,849, filed Jun. 27, 2005, dated for Feb. 3, 2010 (088).

* cited by examiner

FIG. 7.

GAS GENERATOR

CROSS REFERENCE TO RELATED APPLICATIONS

This application claims the benefit of provisional application Ser. No. 60/695,488, filed on Jun. 30, 2005.

BACKGROUND OF THE INVENTION

The present invention relates generally to gas generating systems and, more particularly, to filterless gas generating systems for use in applications such as inflatable occupant restraint systems in motor vehicles.

Installation of inflatable occupant protection systems, generally including airbag systems as standard equipment in all new vehicles has intensified the search for smaller, lighter and less expensive protection systems. Accordingly, since the inflation gas generator used in such protection systems tends to be the heaviest and most expensive component, there is a need for a lighter and less expensive gas generating system.

A typical gas generating system includes cylindrical steel or aluminum housing having a diameter and length related to the vehicle application and characteristics of a gas generant composition contained therein. Inhalation by a vehicle occupant of particulates generated by gas generant combustion during airbag activation can be hazardous. Thus, the gas generating system is generally provided with an internal or external filter comprising one or more layers of steel screen of varying mesh and wire diameter. Gas produced upon combustion of the gas generant passes through the filter before exiting the gas generating system. Particulate material, or slag, produced during combustion of the gas generant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, weight, and expense of the gas generating system. While various gas generant formulations have been developed in which the particulates resulting from combustion of the gas generant are substantially eliminated or significantly reduced, certain types of gas generants are still desirable notwithstanding the relatively high percentage of combustion solids they produce, given favorable characteristics of these gas generants such as burn rate, sustained combustion, and repeatability of performance.

Other ongoing concerns with gas generating systems include the ability to achieve any one of a variety of ballistic profiles by varying as few of the physical parameters of the gas generating system as possible and/or by varying these physical parameters as economically as possible. Also important are the need to increase manufacturing efficiency and the need to reduce manufacturing costs.

BRIEF DESCRIPTION OF THE DRAWINGS

FIG. 6A is a cross-sectional side view of a gas generating system incorporating an alternative embodiment of the baffle system;

DETAILED DESCRIPTION

Figure 1:
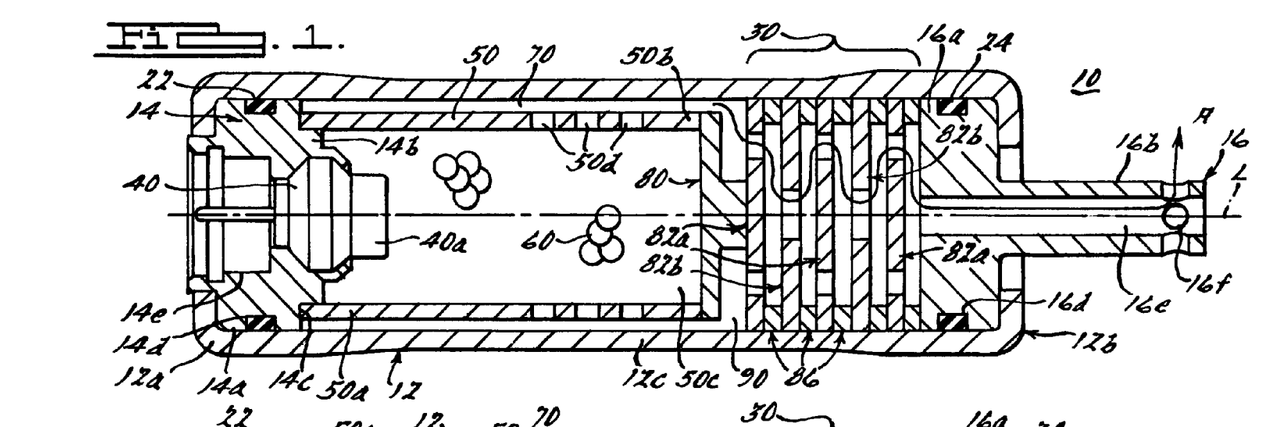
FIG. 1 is a cross-sectional side view of a gas generating system incorporating a baffle system in accordance with the present invention.
Figure 2A:
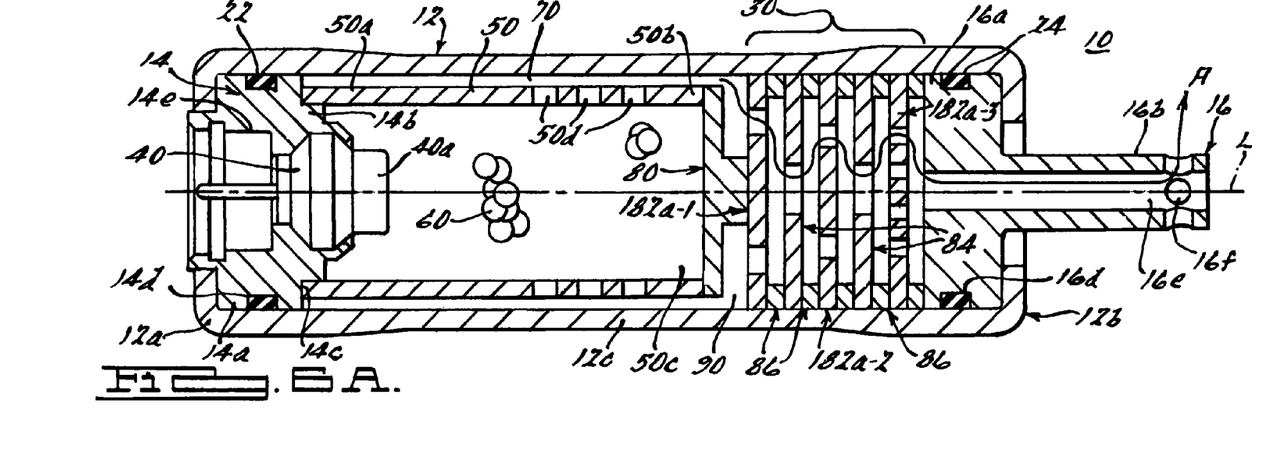
FIG. 2A is a plan view of a multiple-hole gas flow plate in accordance with the present invention.
Figures 2A, 2B:
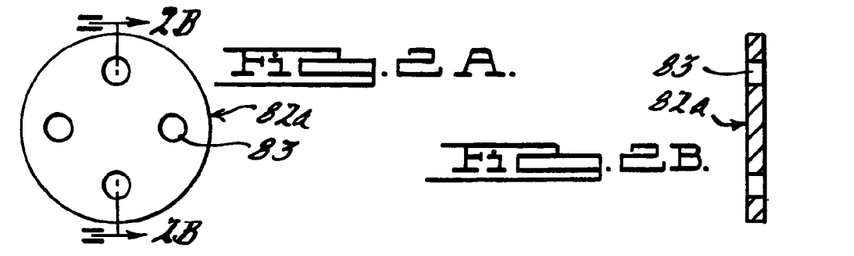
FIG. 2B is a cross-sectional view of the multiple-hole gas flow plate of FIG. 2A.
Figures 3A, 3B:
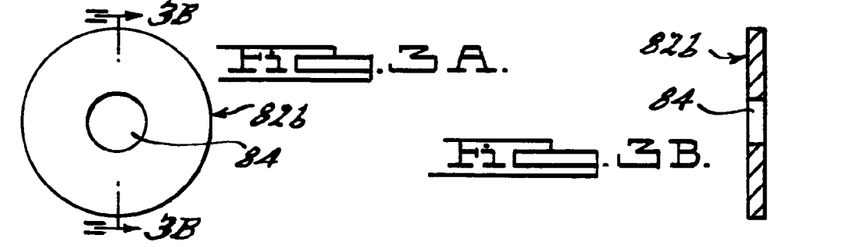
FIG. 3A is a plan view of a single-hole gas flow plate in accordance with the present invention.
FIG. 3B is a cross-sectional view of the single-hole gas flow plate of FIG. 3A.

FIG. 1 shows one embodiment of a gas generating system 10 incorporating a baffle system in accordance with the present invention. Gas generating system 10 includes a substantially cylindrical housing 12 having a pair of opposed ends 12a, 12b and a wall 12c extending between the ends to define a housing interior cavity. A longitudinal axis L extends along the length of the housing. Housing 12 is made from a metal or metal alloy and may be a cast, extruded, or otherwise metal-formed.

An end closure 14 is secured to end 12a of housing 12, using one or more known methods. In FIG. 1, end 12a of housing 12 is crimped over portions of end closure 14 to secure the end closure within the housing. End closure 14 has formed therein a base portion 14a, a center portion 14b extending from base portion 14a to define a peripheral shoulder 14c, a cavity 14d formed along a periphery of base portion 14a, and a central orifice 14e extending through center portion 14b and base portion 14a. Center portion 14b is dimensioned so that an end portion of a tubular gas generant enclosure 50 having a predetermined inner diameter may be engaged with the center portion to abut peripheral shoulder 14c and to form an interference fit with the center portion, thereby positioning and suspending the gas generant enclosure radially inward of housing wall 12c. An O-ring or other resilient seal 22 is positioned in peripheral cavity 14d to provide a substantially gas-tight seal along the interface between end closure 14 and housing wall 12c. End closure 14 may be stamped, extruded, die cast, or otherwise metal formed and may be made from carbon steel or stainless steel, for example.

Referring again to FIG. 1, an igniter assembly 40 is positioned and secured within end closure central orifice 14e so as to enable fluid communication between a cavity 50c containing an associated gas generant composition 60 (described in greater detail below), and an igniter 40a incorporated into the igniter assembly for igniting the gas generant composition upon activation of the gas generating system. Igniter assembly 40 may be secured in central orifice 14e using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products bv, of The Netherlands. Igniter 44a may be formed as known in the art. Exemplary igniter constructions are described in U.S. Pat. Nos. 6,009,809 and 5,934,705, incorporated herein by reference. Igniter 40a may be secured within igniter assembly 40 by any one of a variety of methods, for instance using welds, adhesives, by crimping, or by integrally molding the igniter into a portion of the igniter assembly.

A longitudinal gas generant enclosure 50 is radially inwardly spaced from housing wall 12c and extends along longitudinal axis L from proximate housing first end 12a toward housing second end 12b. Enclosure 50 has an elongate, substantially cylindrical body defining a first end 50a proximate first end 12a of housing 12, a second end 50b opposite first end 50a, and an interior cavity 50c for containing a quantity of a gas generant composition 60 therein. Enclosure first end 50a is configured to enable fluid communication between igniter 40a and a gas generant composition stored in interior cavity 50c upon activation of the gas generating system. Enclosure 50 is spaced apart from housing wall 12c to form an annular gas flow passage 70 extending along enclosure 50 between the enclosure and housing wall 12c. Enclosure 50 is provided with a plurality of gas exit apertures 50d distributed therealong to facilitate propagation of a combustion reaction of gas generant composition 60 along interior cavity 50c in a manner known in the art, and to enable-fluid communication between interior cavity 50c and gas flow passage 70. Enclosure 50 may be formed as known in the art, and may, for example, be roll-formed from sheet metal or extruded and then perforated to produce apertures 50d. Enclosure apertures 50d may be environmentally sealed with an aluminum tape (not shown) or any other effective seal. As previously described, an end portion of gas generant enclosure 50 is engaged with first end closure center portion 14b to abut peripheral shoulder 14c and to form an interference fit with the center portion, thereby positioning and suspending the gas generant enclosure radially inward of housing wall 12c.

Referring again to FIG. 1, a quantity of a gas generant composition 60 is contained within enclosure interior cavity 50c for production of gases when ignited by igniter 40a. Gas generant 60 may be in any of a variety of forms, for example tablets, stacked wafers, or in granulated form. Gas generant composition 30 may be formulated by known methods, and is exemplified by compositions described in U.S. Pat. Nos. 5,872,329, 6,074,502, 6,287,400, 6,306,232 and 6,475,312 incorporated by reference herein. As used herein, the term "smokeless" should be generally understood to mean such propellants as are capable of combustion yielding at least about 90% gaseous products based on a total product mass; and, as a corollary, no more than about 10% solid products based on a total product mass. It has been generally found that the use of gas generant compositions having the combustion characteristics described in the cited patents helps obviate the need for the filters used in other gas generating system designs. However, the present invention is not limited to the use of smokeless gas generant compositions therein. In addition, selection of suitable gas generant compositions capable of combusting to produce gas without an undue quantity of particulates helps to obviate the need for a conventional filter. Obviating the need for a filter in the gas generating system allows the system to be simpler, lighter, less expensive and easier to manufacture.

The present invention broadly comprises a gas generating system formed without the conventional filter required in earlier designs for cooling the gases and removing particulate materials from the gases. A baffle system is employed in place of the filter whereby upon gas generant combustion, slag is trapped within the baffle system and gases are also cooled therein.

Figures 5A, 5B:
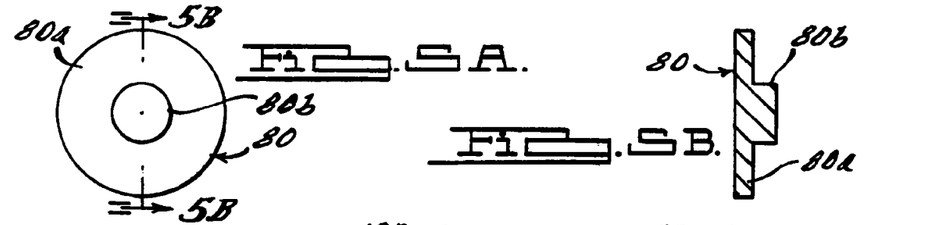
FIG. 5A is a plan view of a blank plate in accordance with the present invention.
FIG. 5B is a cross-sectional view of the blank plate of FIG. 5A.
Figure 6B:
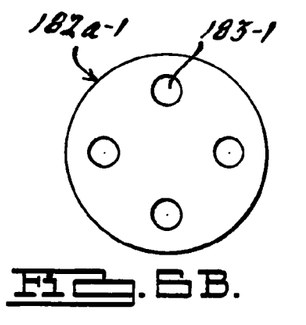
FIGS. 6B-6D are plan views of a multiple-hole gas flow plates incorporated into the embodiment of the baffle system shown in FIG. 6A.
Figure 6C:
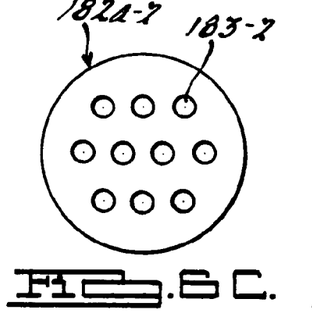
Figure 6D:
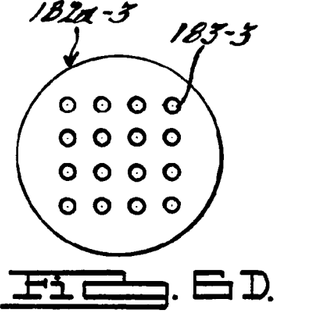
Figure 7:
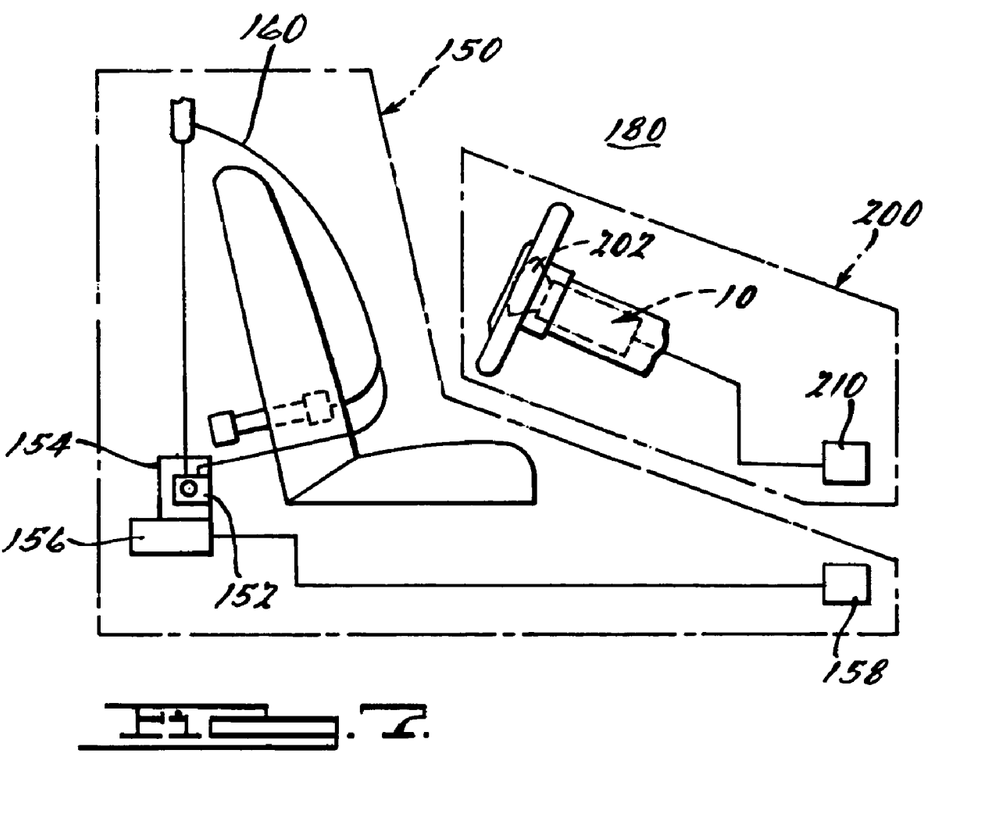
FIG. 7 is a schematic representation of an exemplary vehicle occupant restraint system incorporating a gas generating system including a baffle system in accordance with the present invention.

Referring to FIGS. 1, 5A, and 5B, a blank plate 80 is pressed against an end of gas generant enclosure 50 to seal enclosure interior cavity 50c. Blank plate 80 has a base portion 80a and a spacer portion 80b extending from a surface of base portion 80a. If desired, blank plate 80 may be attached (for example, by crimping or welding) to the end of enclosure 50 to form a substantially gas-tight seal at the seam between the enclosure and the plate. As shown in FIG. 1, blank plate 80 may be braced and secured against a face of flow plate 82 (described below) to aid in positioning and securing enclosure 50 within housing 12. Alternatively, edges of plate 80 may abut housing wall 12c to position and secure the plate within the housing, with gas flow apertures (not shown) formed along the edge of the plate to permit gas flow between passage 70 and baffle system 30 (described below).

Referring to FIGS. 1 and 2A-4B, gas flow passage 70 enables fluid communication between gas generant enclosure interior cavity 50c and a baffle system, generally designated 30. In the embodiment shown in FIG. 1, baffle system 30 comprises a plurality of adjacent plates 82, 86 positioned along the interior of housing 12 between gas generant enclosure 50 and a diffuser portion 16 (described below). As used herein, the term "adjacent" is used to indicate a condition in which the plates are positioned close to each other or near each other, and also to indicate a condition where the plates are in physical contact with each other. Also, as used herein, the term "plate" is defined as a substantially flat, relatively thin body of substantially uniform thickness.

Figures 4A, 4B:
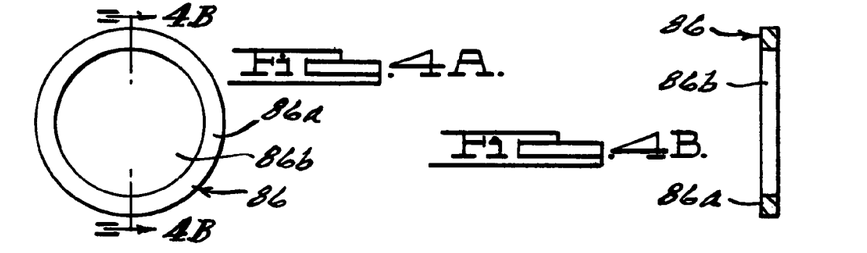
FIG. 4A is a plan view of a spacer plate in accordance with the present invention.
FIG. 4B is a cross-sectional view of the spacer plate of FIG. 4A.

In the embodiment shown in FIGS. 1 and 2A-4B, baffle system 30 includes a plurality of flow plates comprising plates 82a, 82b (FIGS. 1, 2A, 2B, 3A, 3B) and a plurality of spacer plates 86 (FIGS. 1, 4A, and 4B). As seen from the drawings, each of the spacer plates 86 has a first orifice configuration, and each of the flow plates 82 has an orifice configuration different from the first orifice configuration on the spacer plates. In addition, as seen in FIG. 1, ones of spacer plates 86 and ones of flow plates 82 are arranged adjacent each other in alternating fashion. That is, the plates are arranged along the direction of gas flow such that the gas flow follows the path indicated by arrow A, passing through one of flow plates 82a or 82b, then through one of spacer plates 86, then through another one of flow plates 82a or 82b, then through another one of spacer plates 86, in succession along the flow direction of the gases until the gases have flowed through all of the adjacent plates. As used herein, the term "orifice configuration" refers to the arrangement of gas flow orifices along a particular baffle plate.

Referring to FIGS. 1, 4A, and 4B, spacer plates 86 are generally annular in structure, comprising an outer rim 86a enclosing a plate interior orifice 86b from which the plate material interior of the rim is removed. As seen in FIG. 1, each spacer plate 86 serves to fluidly connect orifices in flow plates 82 (described in greater detail below) adjacent the spacer plate, to enable passage of gases between flow plates 82. Generally, orifice 86b formed in spacer plate 86 has a diameter or extent sufficient to circumscribe or enclose therein all of the orifices formed in any adjacent flow plate 82. This ensures that gases exiting each flow plate orifice(s) on one side of the spacer plate may be passed through to the flow plate orifice(s) in the flow plate 82 on an opposite side of the spacer plate.

Referring to FIGS. 1 and 2A-3B, flow plates 82 include plates 82a having multiple gas flow holes or orifices formed therein and plates 82b each having a single gas flow hole or orifice formed therein. Also, from FIG. 1, it may be seen that ones of flow plates 82a and ones of flow plates 82b are arranged in alternating fashion along a direction of flow of gases through the plurality of adjacent plates. Hole patterns are formed in plates 82a and 82b such that, when spacer plates 86 and flow plates 82a, 82b are stacked in alternating fashion, as shown in FIG. 1, holes formed in each of flow plates 82a, 82b are in fluid communication with the interior cavity 86b of each spacer plate 86 adjacent the flow plate. This arrangement enables gases to flow from multiple-hole flow plates to single-hole flow plates (and vice versa) via interior cavities 86b of spacer plates 86.

FIG. 1 shows a multiple-hole flow plate 82a abutting blank plate spacer portion 80b to form an annular space 90 between blank plate 80 and multiple-hole plate 82a. Space 90 is in fluid communication with both annular gas flow passage 70 and holes 83 (FIG. 2A) extending through multiple-hole plate 82a, thereby enabling gases flowing-along annular passage 70 to flow into baffle system 30.

As seen in FIGS. 1 and 2A-3B, and as explained above, each of flow plates 82a, 82b has at least one through orifice formed therein. In addition, as seen from FIG. 1, each orifice in any given plate of flow plates 82a, 82b is in fluid communication with at least one orifice in each flow plate adjacent the given flow plate so as to collectively define at least one gas flow path extending through the plurality of adjacent plates. Also, in the particular embodiment shown in FIG. 1, each orifice in any given flow plate of flow plates 82a, 82b is in fluid communication with each orifice in each flow plate adjacent the given flow plate. Thus gases passing through any of flow plate orifices 83, 84 may pass through each orifice (or orifices) formed in any adjacent flow plate. This enables the gas flow through the baffle system to be split into a number of streams or merged into a single stream, in any of a variety of ways suitable for a particular application.

Referring again to FIG. 1, baffle system 30 may be positioned adjacent a hollow diffuser portion 16 formed proximate housing second end 12b. In FIG. 1, end 12b of housing 12 is crimped over diffuser portion 16 to secure the diffuser within the housing. Diffuser portion 16 has formed therein a base portion 16a, a center portion 16b extending from base portion 16a, a cavity 16d formed along a periphery of base portion 16a, and a central orifice 16e extending through center portion 16b and base portion 16a. A plurality of gas discharge orifices 16f is preferably spaced about a circumference of an end of center portion 16b. The embodiment shown in FIG. 1 includes four gas discharge orifices 16f substantially evenly spaced about an end of diffuser portion 16. Diffuser central orifice 16e and gas discharge orifices 16f enable fluid communication for generated gases between a baffle system 30 (described in greater detail below) and an exterior of the housing for use, for example, in inflating an associated inflatable element of a vehicle occupant protection system. An O-ring or other resilient seal 24 is positioned in peripheral cavity 16d to provide a substantially gas-tight seal along the interface between diffuser portion 16 and housing wall 12c. A rupturable, fluid-tight seal (not shown) may also be positioned across central orifice 16e to isolate the baffle system from gas discharge orifices 16f prior to activation of the gas generating system. The seal is secured to a face of diffuser portion 16 and forms a fluid-tight barrier between the diffuser portion and baffle system 30. Various disks, foils, films, or tapes may be used to form the seal. Diffuser portion 16 may be formed integrally with housing 12. Alternatively, diffuser portion 16 may be machined or otherwise formed from steel or other suitable materials, and then welded, crimped, or otherwise fixed to housing second end 12b.

Operation of the gas generating system will now be discussed with reference to FIG. 1. Upon receipt of a signal from a crash sensor, an electrical activation signal is sent to igniter 40a, thereby igniting gas generant 60. Ignition of gas generant 60 results in a relatively rapid generation of combustion gases in the interior of enclosure 50c, which flow out of chamber 50c through orifices 50d, into passage 70 and then into baffle system 30. Gases flowing into baffle system 30 proceed along a path indicated by arrow A, through alternating multiple-hole 82a and single-hole 82b flow plates (with spacer plates 86 positioned between the alternating flow plates) until the gases reach diffuser central orifice 16e. The gases then flow along diffuser central orifice 16e to discharge orifices 16f. As gases flow from the interior of gas generant enclosure 50 through annular passage 70 and the tortuous gas flow path provided by the baffle system 30, the gases are cooled and particulates are removed from the gases.

Plates 80, 82a, 82b, and 86 may be stamped from a metallic material or a stampable, temperature-resistant polymer material. Alternatively, the plates may be molded from a suitable polymer material. In an embodiment where stamped plates are used, it may be preferable to deburr the stamped plates prior to assembly into the gas generating system in order to help ensure that abutting surfaces of adjacent plates rest flush against each other, and to help control undesirable gas pressure losses due to excess friction and turbulence in the gas flow. Plates 80, 82, and 86 may be pre-stacked into a desired sequence and secured together (for example, by application of an adhesive) prior to insertion into housing 12.

In an alternative embodiment (not shown), flow plates 82a, 82b are spaced apart within the baffle system using blocks or other spacing elements structured and positioned to permit generated gases to occupy more of the space between adjacent flow plates 82 during flow through the baffle system. It is believed that this arrangement increases turbulence in the gas flow and also increases the average residence time of the gases within the baffle, thereby enhancing cooling and particulate removal from the gases.

As described above, the present invention contemplates a condition wherein each plate of at least a portion of the plurality of adjacent plates 82, 86 is in contact with at least one adjacent plate. In a particular embodiment, each plate of the plurality of adjacent plates 82, 86 is in contact with at least one adjacent plate. In a more particular embodiment, shown in FIG. 1, each plate of the plurality of adjacent plates 82, 86 is in contact with a pair of adjacent plates. Positioning all of plates 82, 86 in contact with each other enables the baffle system to be made more compact, thereby enabling the gas generating system to be made smaller while still providing a baffle system having sufficient cooling and particulate removal capacity for a particular application. Also, in the embodiment shown in FIG. 1, plates 82, 86 are arranged along axis L. As seen from arrow A, gas flow from a flow plate 82a to an adjacent flow plate 82b is directed radially inward with respect to axis L, and gas flow from a flow plate 82b to an adjacent flow plate 82a is directed radially outward with respect to the axis. Arrangements of flow plates 82 and spacer plates 86 other than the arrangements shown herein are also possible.

Referring to FIGS. 6A-6D, another particular embodiment 130 of the baffle system includes flow plates 182 comprising a group of plates 182a-1, 182a-2, and 182a-3. Each plate includes a respective plurality of orifices 183-1, 183-2, 183-3. In addition, an average area of the orifices in a given flow plate decreases along a direction of flow of gases through the plurality of adjacent plates. That is, the average area of the holes or orifices in plate 182a-2 is less than the average area of holes in plate 182a-1, and the average area of the holes or orifices in plate 182a-3 is less than the average area of the holes in plate 182a-2. As used herein, the "average area" of the orifices in a given plate 82 is understood to mean the total number of orifices divided by the combined area of all of the orifices. It is believed that the use of gradually decreasing orifice sizes in plates along the gas flow direction enables the trapping of smaller particulates as the gas flow progresses-through-the baffle system.

Factors such as the number and thicknesses of the plates, the materials from which the plates are formed, and the sizes and positions of the holes formed in spacer plates and flow plates may be varied to affect such factors as the pressure drop in the gas flowing through the baffle system and the tortuousness and length of the flow path of the gases through the baffle system, enabling the system to be adjusted to meet the cooling and particulate removal requirements of a particular application. In addition, by appropriate selection of materials and plate thicknesses, the weight and material costs of the baffle system (and, correspondingly, the total weight and cost of the gas generating system) may be minimized. Also, the plates of the baffle system disclosed herein are easier to manufacture and easier to assemble into the gas generating system than are conventional filters. Although the embodiments of the gas generating system described herein do not contain a conventional filter (for example, a wire mesh filter), a filter formed by known or otherwise suitable methods may be included if desired.

It may also be seen that features such as the number of plates and the orifice configurations of the individual plates can be tailored according to the requirements of a particular application to provide any of a wide variety of gas flow path arrangements and flow path lengths. For example, the gas flow path length achievable in a predetermined volume of baffle system may be increased by increasing the number of plates while decreasing the thickness of the plates. It may also be seen that the embodimebnts of the baffle system described herein provide a compact, effective mechanism for cooling and filtering generated gases.

Referring to FIG. 6, in one possible application of the gas generating system described herein, an embodiment of the gas generating system is incorporated into an airbag system 200. Airbag system 200 includes at least one airbag 202 and a gas generating system 10 incorporating a baffle system as described herein and coupled to the airbag so as to enable fluid communication with an interior of the airbag upon activation of the gas generating system. Airbag-system 200 may be in communication with a crash event sensor 210 that is in operative communication with a crash sensor algorithm (not shown) which signals activation of airbag system 200 via, for example, activation of igniter 40a (not shown in FIG. 6) in the event of a collision.

Referring again to FIG. 6, an embodiment of the gas generator or an airbag system including an embodiment of the gas generator may be also incorporated into a broader, more comprehensive vehicle occupant protection system 180 including additional elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419, 177, incorporated herein by reference.

Safety belt assembly 150 may be in communication with a crash event sensor 158 (for example, an inertia sensor or an accelerometer) that is in operative communication with a crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the various components may be molded. stamped or otherwise metal formed from carbon steel, aluminum, metallic alloys, or polymeric equivalents.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A baffle system for use in a gas generating system, the baffle system including a plurality of adjacent plates, each plate of the plurality of adjacent plates having at least one through orifice formed therein, each orifice in any given plate of the plurality of adjacent plates being in fluid communication with at least one orifice in each plate adjacent the given plate so as to provide at least one gas flow path extending through the plurality of adjacent plates, wherein the plurality of adjacent plates comprise a plurality of first plates and a plurality of second plates, each of the first plates having a first orifice configuration, each of the second plates having an orifice configuration different from the first orifice configuration, and wherein plates of the first plates and plates of the second plates are arranged adjacent each other in alternating fashion, wherein the orifice configuration of each of the second plates includes a plurality of orifices, and wherein an average area of the orifices in a given second plate decreases along a direction of flow of gases through the plurality of adjacent plates.

2. A gas generating system including a baffle system in accordance with claim 1.

3. A baffle system for use in a gas generating system, the baffle system including a plurality of adjacent plates, each plate of the plurality of adjacent plates having at least one through orifice formed therein, each orifice in any given plate of the plurality of adjacent plates being in fluid communication with at least one orifice in each plate adjacent the given plate so as to provide at least one gas flow path extending through the plurality of adjacent plates wherein the plurality of adjacent plates comprise a plurality of first plates and a plurality of second plates, each of the first plates having a first orifice configuration, each of the second plates having an orifice configuration different from the first orifice configuration, and wherein plates of the first plates and plates of the second plates are arranged adjacent each other in alternating fashion, wherein a first portion of the plurality of second plates has a second orifice configuration, and a second portion of the plurality of second plates has a third orifice configuration different from the second orifice configuration, and wherein plates of the first portion of the plurality of second plates are arranged in alternating fashion with plates of the second portion of the plurality of second plates along a direction of flow of gases through the plurality of adjacent plates.

4. The baffle system of claim 3 wherein the plates of the plurality of adjacent plates are arranged along an axis, gas flow from a plate of the first portion of the plurality of second plates to a plate of the second portion of the plurality of second plates is directed radially outward with respect to the axis, and wherein gas flow from a plate of the second portion of the plurality of second plates to a plate of the first portion of the plurality of second plates is directed radially inward with respect to the axis.

5. A gas generating system including a baffle system in accordance with claim 3.

6. A baffle system for use in a gas generating system, the baffle system including a plurality of adjacent plates, each plate of the plurality of adjacent plates having at least one through orifice formed therein, each orifice in any given plate of the plurality of adjacent plates being in fluid communication with at least one orifice in each plate adjacent the given plate so as to provide at least one gas flow path extending through the plurality of adjacent plates wherein the plurality of adjacent plates comprise a plurality of first plates and a plurality of second plates, each of the first plates having a first orifice configuration, each of the second plates having an orifice configuration different from the first orifice configuration, and wherein plates of the first plates and plates of the second plates are arranged adjacent each other in alternating fashion, wherein each of the first plates has a single orifice, each of the second plates has a plurality of orifices, and wherein each single orifice of each first plate is in fluid communication with each orifice of the plurality of orifices of each second plate adjacent the first plate.

7. A gas generating system including a baffle system in accordance with claim 6.

8. A baffle system for use in a gas generating system, the baffle system including a plurality of adjacent plates, each plate of the plurality of adjacent plates having at least one through orifice formed therein, each orifice in any given plate of the plurality of adjacent plates being in fluid communication with at least one orifice in each plate adjacent the given plate so as to provide at least one gas flow path extending through the plurality of adjacent plates, wherein the plurality of adjacent plates comprise a plurality of first plates and a plurality of second plates, each of the first plates having a first orifice configuration, each of the second plates having an orifice configuration different from the first orifice configuration, wherein plates of the first plates and plates of the second plates are arranged adjacent each other in alternating fashion, wherein the orifices in adjacent second plates are arranged with respect to each other such that fluid flow from a first second plate to another second plate adjacent the first second plate is directed one of either radially inward or radially outward with respect to the axis, and wherein fluid flow from the other second plate to a third second plate adjacent the other second plate is directed the other of either radially inward or radially outward with respect to the axis.

9. A gas generating system including a baffle system in accordance with claim 8.

10. A baffle system for use in a gas generating system, the baffle system comprising a plurality of adjacent plates, the plurality of adjacent plates including a plurality of first plates and at least three second plates, each of the first plates having a first orifice configuration, each of the second plates having an orifice configuration different from the first orifice configuration, wherein plates of the first plates and plates of the second plates are arranged adjacent each other in alternating fashion, wherein the orifice configuration of each of the second plates includes a plurality of orifices, and wherein an average area of the orifices in a given second plate decreases along a direction of flow of gases through the plurality of adjacent plates.

11. A gas generating system including a baffle system in accordance with claim 10.

12. A vehicle occupant protection system including a gas generating system, the gas generating system having a baffle system in accordance with claim 10.

* * * * *

UNITED STATES PATENT AND TRADEMARK OFFICE
CERTIFICATE OF CORRECTION

PATENT NO. : 7,762,585 B2
APPLICATION NO. : 11/479494
DATED : June 30, 2006
INVENTOR(S) : Patterson et al.

It is certified that error appears in the above-identified patent and that said Letters Patent is hereby corrected as shown below:

Column 7, Line 11; Delete "-".

Column 7, Line 39; Delete "embodimebnts" and insert --embodiments--.

Column 7, Line 49; Delete "-".

Signed and Sealed this

Twenty-third Day of November, 2010

David J. Kappos
*Director of the United States Patent and Trademark Office*